(12) United States Patent
Ham

(10) Patent No.: US 10,161,578 B2
(45) Date of Patent: Dec. 25, 2018

(54) LED RETROFIT KIT FOR TROFFER HOUSINGS

(71) Applicant: Richard Ham, Irvine, CA (US)

(72) Inventor: Richard Ham, Irvine, CA (US)

( * ) Notice: Subject to any disclaimer, the term of this patent is extended or adjusted under 35 U.S.C. 154(b) by 0 days.

(21) Appl. No.: 15/452,478

(22) Filed: Mar. 7, 2017

(65) Prior Publication Data

US 2018/0017218 A1    Jan. 18, 2018

Related U.S. Application Data

(60) Provisional application No. 62/495,597, filed on Jul. 16, 2016.

(51) Int. Cl.
| | |
|---|---|
| *F21S 8/02* | (2006.01) |
| *F21V 17/12* | (2006.01) |
| *F21V 3/02* | (2006.01) |
| *F21Y 115/10* | (2016.01) |
| *F21Y 105/10* | (2016.01) |

(52) U.S. Cl.
CPC ............... *F21S 8/026* (2013.01); *F21V 3/02* (2013.01); *F21V 17/12* (2013.01); *F21Y 2105/10* (2016.08); *F21Y 2115/10* (2016.08)

(58) Field of Classification Search
CPC .. F21K 9/278; F21S 8/026; F21V 3/02; F21V 17/12; F21V 23/005; F21Y 2103/10; F21Y 2115/10
See application file for complete search history.

(56) References Cited

U.S. PATENT DOCUMENTS

| | | | |
|---|---|---|---|
| 8,272,763 B1 * | 9/2012 | Chinnam | F21V 29/004 362/147 |
| 9,206,948 B1 * | 12/2015 | Scribante | F21V 21/03 |
| 2013/0051008 A1 * | 2/2013 | Shew | H02J 9/065 362/235 |

* cited by examiner

*Primary Examiner* — Evan P Dzierzynski
(74) *Attorney, Agent, or Firm* — Cislo & Thomas, LLP

(57) ABSTRACT

An improved LED retrofit kit for troffer style fluorescent lights is presented. The improved retrofit kit includes an interface panel to which is attached one or more LED boards. The interface panel includes flexible legs that allow it to be snapped into a well of a typical troffer housing. The LED retrofit kit further includes an LED power supply or driver with associated wiring which may optionally be attached to the interface panel or the troffer housing. The present invention is improves upon prior art LED retrofit designs by providing a low cost system that may be installed without the use of tools and, in particular, does not require the drilling of any new holes in an existing troffer housing.

18 Claims, 24 Drawing Sheets

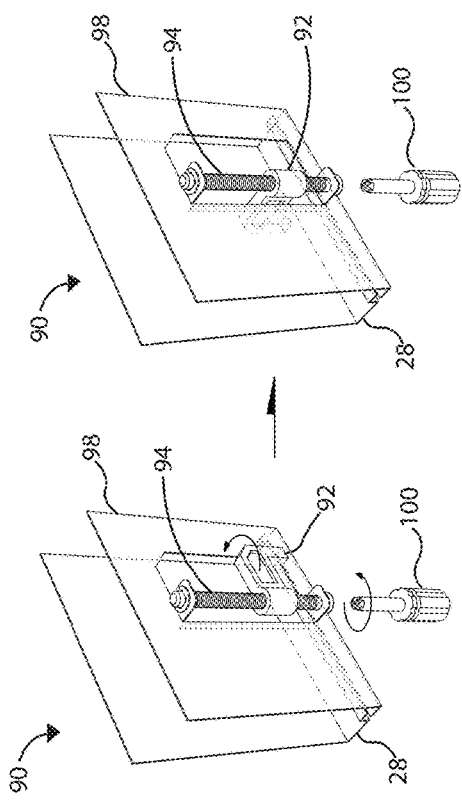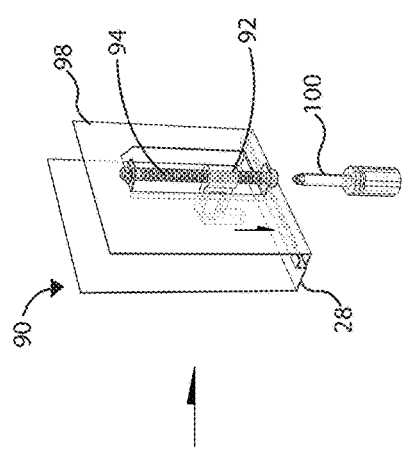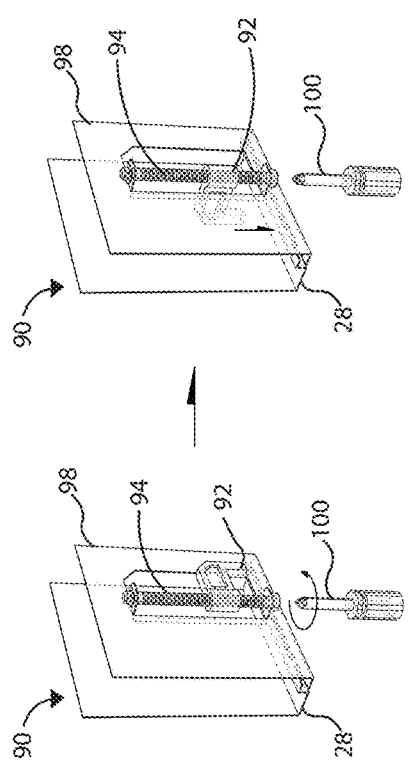

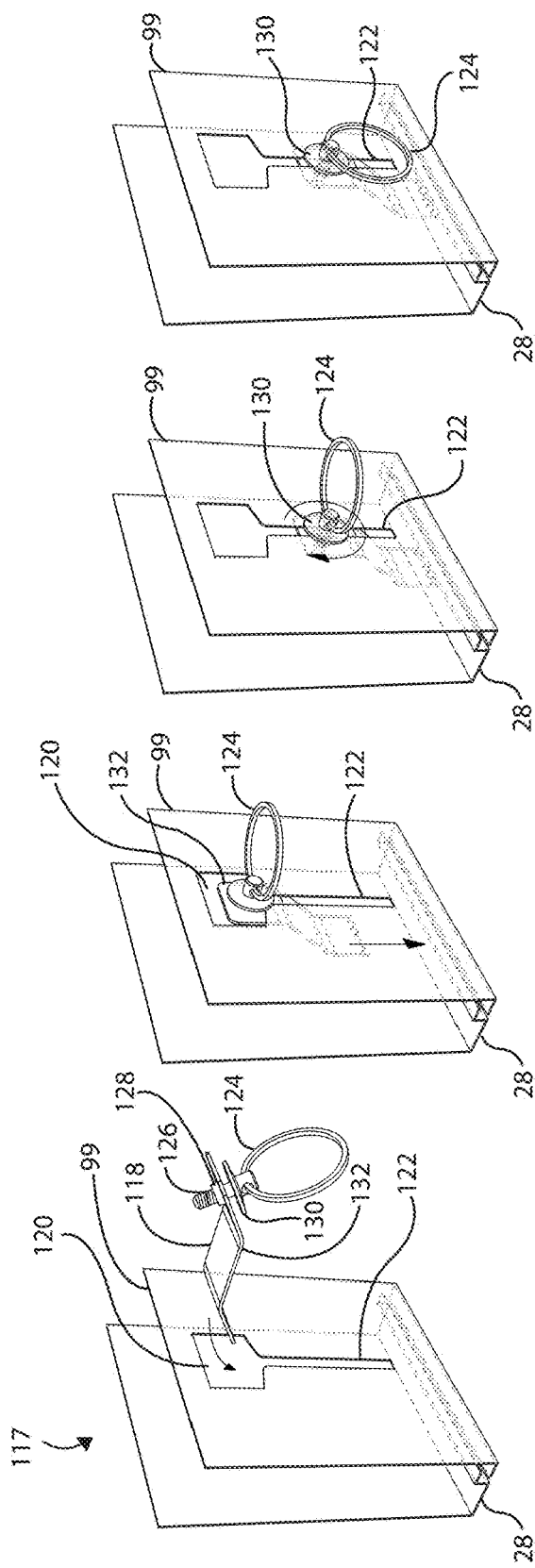

LED RETROFIT KIT FOR TROFFER HOUSINGS

CROSS-REFERENCE TO RELATED APPLICATIONS

This patent application claims priority from U.S. Utility application Ser. No. 15/212,203 entitled "Luminare Retrofit Kit," filed on Jul. 16, 2016, which is incorporated herein by this reference.

BACKGROUND OF THE INVENTION

Field of the Invention

The present invention relates generally to the problem of retrofitting fluorescent light fixtures with light emitting diode ("LED") conversion kits and, in particular, to retrofitting troffer style fluorescent lighting fixtures with an LED conversion kits.

Background of the Invention

A troffer is a rectangular fluorescent light fixture that typically fits into a modular dropped ceiling grid and is the most common type of light fixture for use in commercial office spaces, schools, and industrial facilities. In the United States, standard troffer sizes are 1'×4', 2'×2' and 2'×4', but may also be formed in other sizes. Standard troffer fixtures are typically designed to accommodate standard fluorescent lamps, i.e. T12, T8, or T5 fluorescent tubes. Troffers are typically recessed sitting above the ceiling grid, but are also available in surface mount "versions." A typical fluorescent light troffer fixture will include hardware for mounting the tubes and a power supply or ballast configured for operating the fluorescent lights. The ballast and associated wiring will often be hidden under a channel attached to the troffer.

Functional fluorescent lights were first developed around the turn of the last century. Many early designs were attempted including the design disclosed in U.S. Pat. No. 865,367, entitled Fluorescent Electric Lamp, which issued to Thomas Edison in 1907. Modern fluorescent lamps entered widespread use in 1938 when lamp designs by the General Electric Company and the Sylvania Lighting Company were first introduced to the market. Fluorescent lamps offered several advantages over the then prevailing incandescent lamps including longer life, lower operating costs and cooler operating temperatures. As such, fluorescent lamps became the mainstay lighting source for offices, schools and most industrial facilities. The presently installed base of troffer style fluorescent lamps likely numbers in the tens, if not hundreds of millions.

Recently, LED's which emit an intense bright white light have been developed. LED based lights have several advantages over earlier fluorescent lamps. In particular, LEDs offer greater light output, energy savings, longer life, minimal degradation of light color temperature or lumen output over time, and LED lights contain no environmental contaminants such as mercury or lead, as is the case with fluorescent tubes.

However, the expense of replacing an entire light fixture previously installed may make taking advantage of the improvements offered by LED lights cost prohibitive. Recently, efforts have been made to retrofit previously installed fluorescent light fixtures to provide a less expensive way to take advantage of new LED lighting technology.

Light fixture retrofitting is the practice of replacing or eliminating components in an existing fluorescent light fixture housing, i.e. a troffer, and retrofitting LED components to provide the light fixture with the advantages of LED based lights, i.e. improved light output, energy savings and longer life. Many current retrofitting solutions are overly complex in design, often requiring lengthy and complex installation procedures. The longer the installation of a retrofit solution takes, the less likely that the retrofit solution will make economic sense for the owner of the previously installed light fixture.

Most prior art solutions involve removing the fluorescent tubes, ballast, connectors, and any other non-necessary hardware found in the original troffer, as discussed in the examples below.

One prior art solution tries to fasten a light bar composed of LEDs into a troffer by the use of self-tapping sheet metal screws in the top of the troffer housing. This method is both difficult to install and service. In addition, protection from the elements (water and dust intrusion) is lost when new hole(s) to accommodate the self-tapping screws are drilled into the fixture. Finally light output may not be optimized due to the distance from the light source to the lens.

Another similar prior art solution mounts one or more led strips to a curved flexible reflector and fastens the reflector to the troffer by the means of self-tapping screws through the top of the troffer. Here again, this solution is difficult to install, service and transport. Again protection from the elements is lost with new holes having to be drilled into the troffer housing. Again, light output may not be optimized due to the distance from the light source to the lens.

Another prior art solution attempts to remove the existing door of a specific brand of troffer and re-insert a new retrofit system back in its place by reusing the existing slots designated for the original door's hinge and latch mechanism. This solution cannot universally fit all troffers because door size, slot placement and slot size vary by manufacturer. In addition, there are safety concerns because the original slots were not designed to hold the additional weight of an LED retrofit assembly.

Another prior art solution also attempts to remove the existing door of a troffer and insert a new retrofit system back in its place using an adaptor bracket. Here again, installation is difficult and again protection from the elements, i.e. water and dust instruction, is lost if new holes are drilled into the fixture.

What is needed in the art is an LED retrofit kit that is relatively inexpensive and easy to install in a wide variety of existing troffers without the need to drill holes in the existing troffer housing.

SUMMARY OF THE INVENTION

The present invention is an improved LED retrofit system for troffer housings that improves upon prior art designs by providing a low cost, light weight system that may be installed without the use of tools and, in particular, does not require the drilling of any new holes in the existing troffer housing.

The invention takes advantage of the fact that troffers are typically rectangular sheet metal housings and have rectangular openings for the installation of fluorescent tubes. The inner periphery of the rectangular openings in the troffer housings are generally smaller than the outer periphery of the housing. The inner rectangular peripheries of troffers must be smaller than the outer peripheries and provide a horizontal ledge. Troffers near universally also have an upwardly (vertically) extending stiffening lip around the periphery of the well or ledge. Thus, when the fluorescent tubes and their associated electrical end receptacles are removed from the troffer housing, space is provided for an LED retrofit kit which snaps into the wells or ledges of the troffer housing.

In one embodiment, the LED retrofit system of the present invention comprises two main components, an LED board and an interface panel. The LED board comprises a plurality of LEDs mounted to a circuit board. The interface panel installs the LED board to the troffer. The LED board is mounted to a flat portion of the interface panel. Each of the ends of the interface panel include legs which are bent at an angle and are adapted to snap into and rest upon one of the wells or ledges of a troffer housing.

The retrofit process is conveniently simple and quick. The existing fluorescent tubes are removed from the fixture and power is disconnected to the ballast. The interface panel is pushed into the fixture and its associated legs snap over the inside edges of the troffer housing to rest upon the troffer wells or ledges. The interface panel is supported by the legs sitting in the wells of the fixture and is securely held in place due to the weight of the interface panel and the LED board. Multiple interface panels and LED boards may be used in one fixture. To complete the retrofit, a new LED specific power supply or ballast is installed. The LED specific power supply may be installed on the legs of the LED retrofit kit, a portion of the interface panel or LED board, or in some instances, may be attached to a wall of the troffer housing. The original lens in the troffer can be left in place or retrofitted with a diffusion style lens or a volumetric lens.

In another embodiment, the LED retrofit system of the present invention comprises three main components, an LED board, an interface panel and a set of legs which are removably detachable from the interface panel. The use of detachable legs may provide certain advantages over a fixed leg design. In particular, the use of detachable legs may be desirable in situations where the troffer housing is of a now standard size in that the detachable legs may be configured to provide a greater range of adjustability than can be obtained with fixed legs. In addition the use of detachable legs makes it easier to remove the interface panel from the troffer when servicing is needed.

Another embodiment of the LED retrofit system comprises four essential components, an LED board, an interface panel, one set of detachable legs, and one set of adjustable legs and may optionally include an integrated lens. One end of the interface panel includes detachable legs which are bent at an angle and the other end includes a set of adjustable legs. The interface panel is attached to the troffer housing by the first set of detachable legs which lay over a wall or lip of the well of the troffer housing. The interface panel is pushed into place and the second set of adjustable legs is then adjusted to lay over the other edge of the troffer housing. The adjustable legs may have an L-shaped configuration or may be in the form of a horizontally mounted bolt. The interface panel is supported by these legs sitting in the inside edges of the fixture and securely held in place due to the weight of the interface panel and the led board. Optionally, an integrated lens may be attached to the interface panel.

The above-described retrofit kits are equally suited for use in either traditional office style troffers or warehouse style troffers commonly known as linear high bays.

The above-described embodiments of the present invention overcome the shortcomings of prior art LED retrofit kits which are generally cumbersome and time consuming to install, requiring the use of power tools, by providing an LED Retrofit kit that installs without the use of power tools, requires no new holes to be drilled into the existing fixture, works with all fixture types as it doesn't depend on pre-existing slot positions, ensures maximum light output as the light source doesn't have to sit at the top of the troffer, requires no extra brackets and is easy to maintain for future service calls.

Various additional aspects and advantages of the present invention will become apparent to those of skill in the art from the following detailed description of the preferred embodiments of the invention, when read in light of the accompanying drawings.

BRIEF DESCRIPTION OF THE DRAWINGS

FIG. 5A is a perspective view of another alternative leg assembly for use with the removable leg embodiment of the LED retrofit kit of the present invention of FIG. 1, showing the alternative leg assembly in a disengaged position.

FIG. 25B is a perspective view of the alternative leg assembly of FIG. 25A, showing the leg in an engaged position.

FIG. 25C is a perspective view of another alternative leg assembly for use with the removable leg embodiment of the LED retrofit kit of the present invention of FIG. 1, showing the alternative leg assembly in a disengaged position.

FIG. 25D is a perspective view of the alternative leg assembly of FIG. 25C, showing the leg in an engaged position.

FIG. 28A is a perspective view of a key and slot arrangement, which may be used as an alternative for the removable leg assembly of the LEl) retrofit kit of the present invention of FIG. 1, showing the key in a disengaged position.

FIG. 28B is a perspective view of the key and slot arrangement of FIG. 28A, showing the key inserted in a slot opening.

FIG. 28C is a perspective view of the key and slot arrangement of FIG. 28A, showing the key positioned in a slot and engaging a well of a troffer, prior to tightening the key.

FIG. 28D is a perspective view of the key and slot arrangement of FIG. 28A, showing the key positioned in a slot and engaging a well of a troffer, after tightening the key.

DETAILED DESCRIPTION OF THE PREFERRED EMBODIMENTS

The present invention will now be described more fully hereinafter with reference to the accompanying drawings, in which preferred embodiments of the invention are shown. The invention may, however, be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 18:
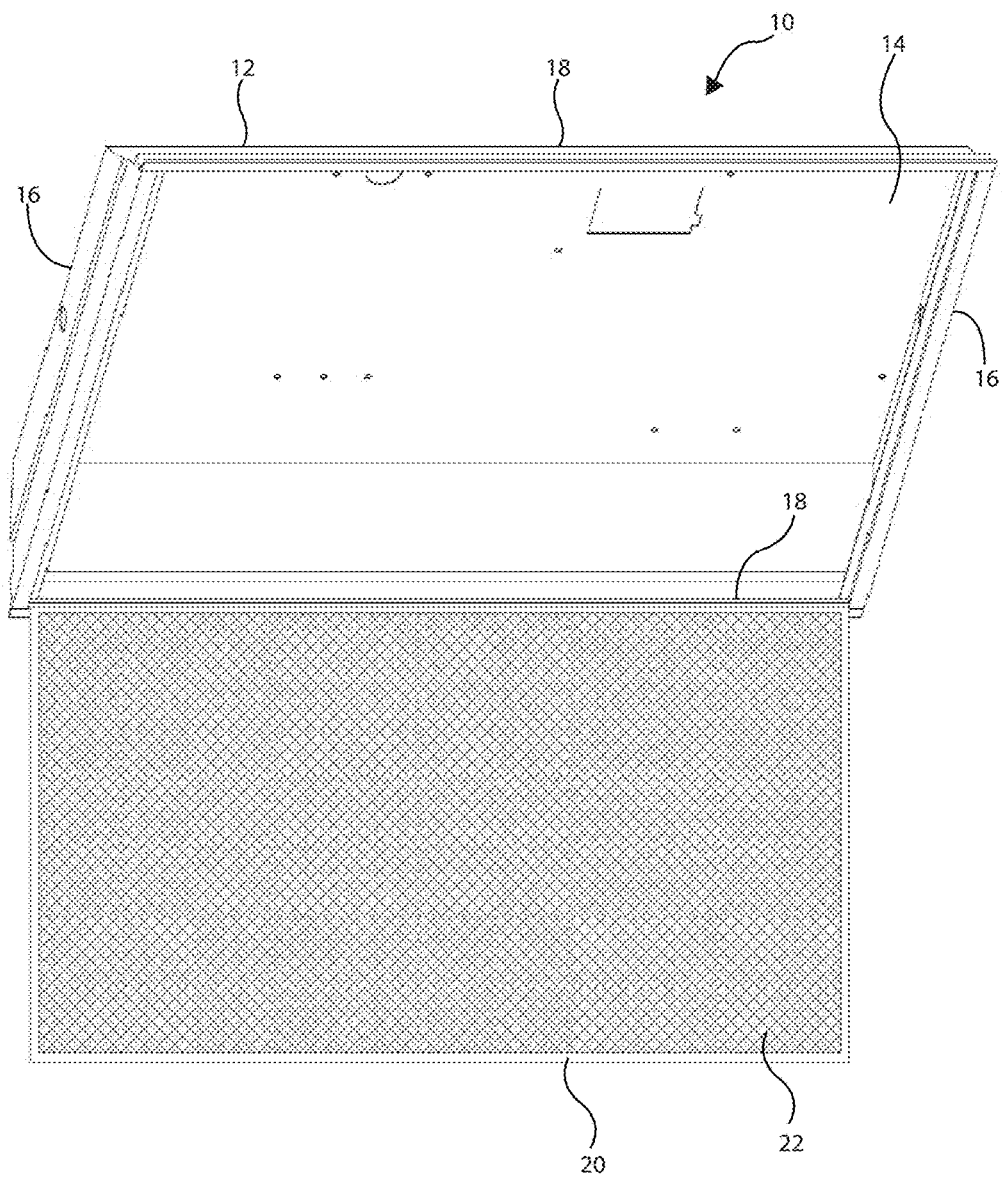
FIG. 18 is a perspective view of a typical troffer housing shown with the fluorescent tubes, fluorescent tube end fittings, ballast and wiring removed, and with the lens/door open.
Figure 19:
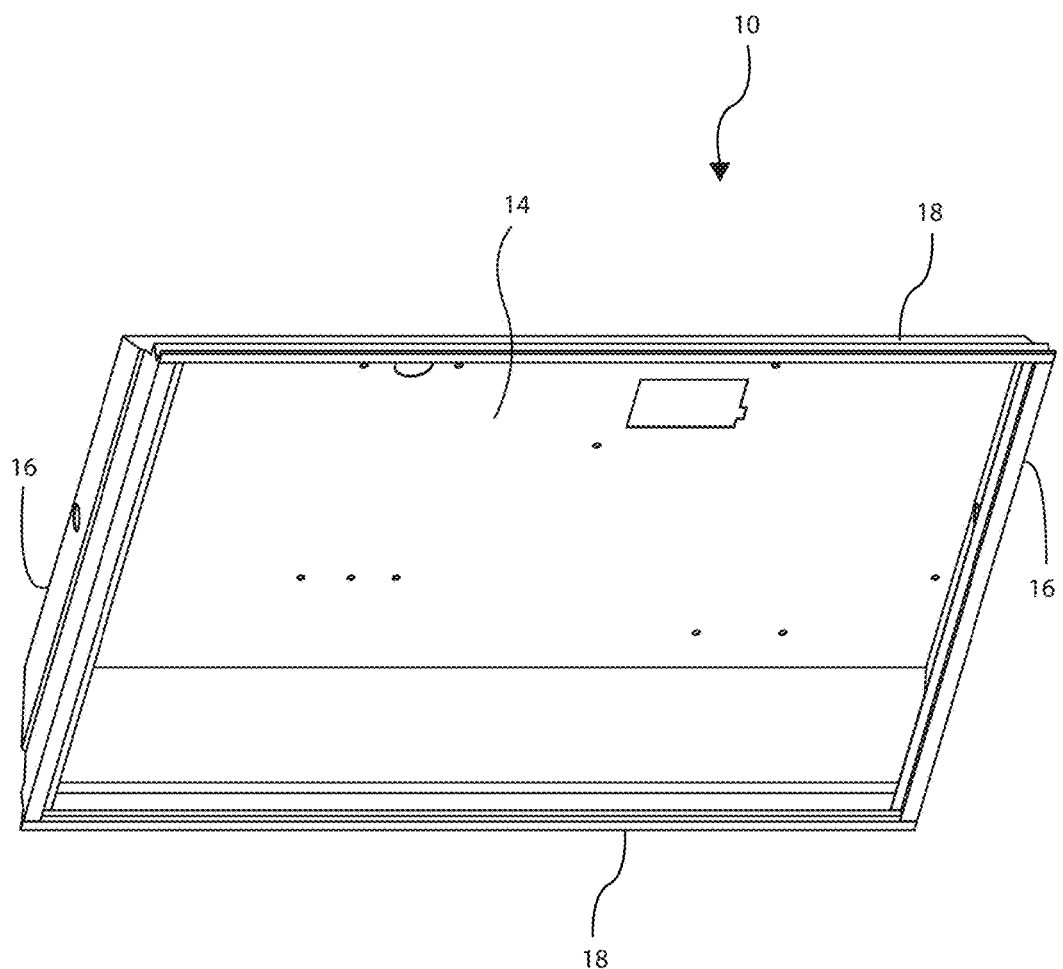
FIG. 19 is a perspective view of the typical troffer housing of FIG. 18, shown with the fluorescent tubes, fluorescent tube end fittings, ballast, wiring and lens/door removed.
Figure 20:
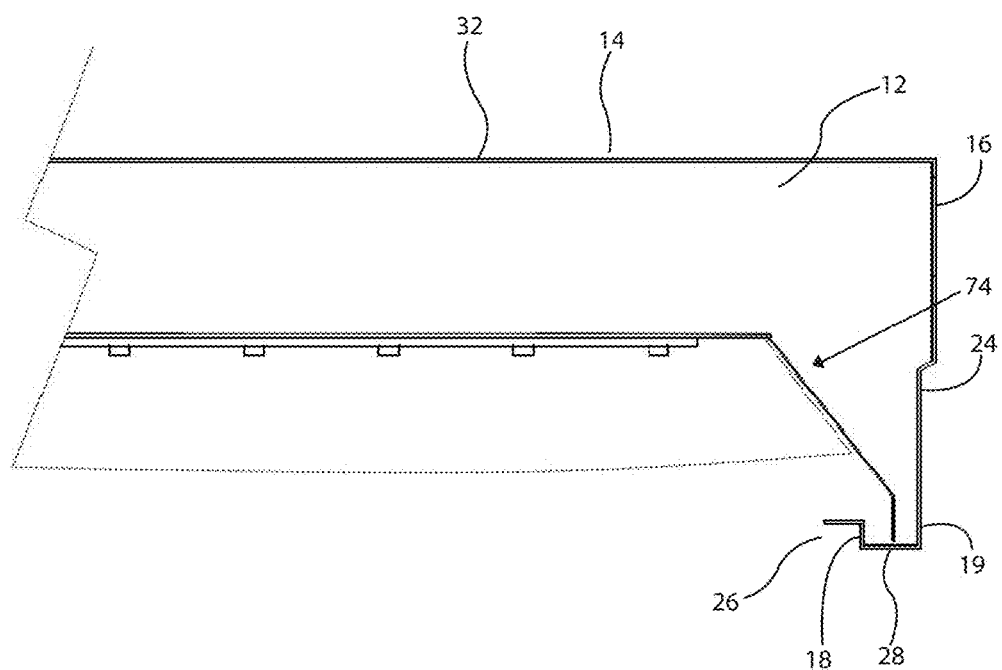
FIG. 20 is a side cut away view of showing the legs of the LED retrofit kit of FIG. 12, sitting in the inner edge or ledge of the troffer of FIG. 18.

With reference to FIGS. 18-20, a typical troffer style light fixture 10 of a type which may be found in offices, super markets, warehouses, cleanrooms and food processing plants is shown. The troffer 10, is typically installed in a ceiling system or hung from pipe, chain or wire. The ceiling system may be a dropped ceiling, or a ceiling grid or tile system. The troffer style light fixture 10 includes a generally rectangular housing 12 which typically includes a top panel 14, four outer side walls 16 and a lens frame 20, which includes a lens 22. The lens frame 20 may be also hinged to the troffer housing 12 and in such cases, the lens and frame also serve as an access door to gain access to the components in the interior of the troffer.

With reference to FIGS. 18-20 and with particular reference to FIG. 20, troffers 10 typically have rectangular openings for the installation of fluorescent tubes. A typical troffer housing 12 will have an outer periphery 24 and an inner periphery 26. The inner periphery 26 of the rectangular opening of a typical troffer housing 12 is generally smaller than that of the outer periphery 24 of the troffer housing 12. The boundary of the inner periphery 26 is defined by four inner walls 18. The boundary of the outer periphery 24 is defined by outer walls 19. Between the outer walls 19 which define the outer periphery 24 and the inner walls 18 which define the inner periphery 26 is a horizontal ledge or well 28 there-between.

In typical troffer housings 12, the well or horizontal ledge 28 can be utilized by an LED retrofit kit to snap into the wells 28 of the troffer housings.

Light emitting diodes (LEDs) have been developed that are more efficient and last longer than fluorescent tubes. An array of LEDs in conjunction with a power supply may be used to replace a fluorescent tube or tubes.

At present, the most commonly used LEDs in light source applications are DC devices and their associated power supplies are DC supplies. However, new types of LEDs, referred to as AC LEDs, i.e. LEDs that operate directly on AC power have been developed. As AC LEDs are further developed and become more prevalent, the need for a separate power supply to drive the LEDs may no longer be required, that is, future AC LEDs may be able to operate directly off of 110 or 277 volt AC power. Both 110 and 277 volt AC power are regularly available in industrial facilities and commercial buildings in the United States.

While the LED retrofit kit of the present invention is described to retrofit a fluorescent tube style troffer it is not limited to fluorescent tube style troffers as the retrofit kit can also be used to upgrade High Intensity Discharge Shoeboxes/Area lights, vapor tights, strip fixtures, street lights, high-bay and warehouse lighting and any other lighting fixtures which possess a well or ledge 28 (see FIGS. 8 and 20) embedded into an edge of the fixture.

With reference to FIGS. 1-6, an embodiment of an LED retrofit kit 30 in accordance with the present invention is shown. The LED retrofit kit 30 comprises an interface panel 32, a pair of legs 34, one or more LED circuit boards 36 featuring a plurality of LEDs 38 in electrical circuit, and an LED specific power supply or driver 42 (see FIG. 4). The plurality or array of LEDs 38 mounted to the circuit board 36 is often referred to as an LED board 40.

Figure 10:
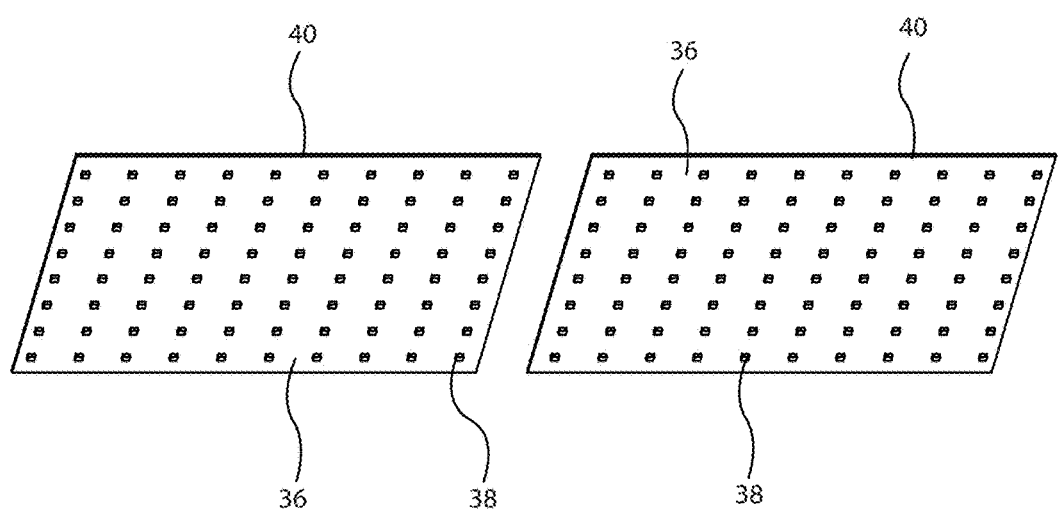
FIG. 10 is a front side perspective view of an ED board suitable for use with the LED retrofit kit of the present invention.

As referenced above, an LED board 40 in conjunction with a power supply 42 (see FIG. 4), may be used to replace a fluorescent tube. With reference to FIG. 10, a schematic representation of an LED board 40 is depicted. The LED board comprises the circuit board 36 which is typically made from a phenolic material and has a plurality of circuit traces made from copper or another electrically conductive material. The circuit board 36 secures and electrically interconnects the plurality of LEDs 38.

Figure 11:
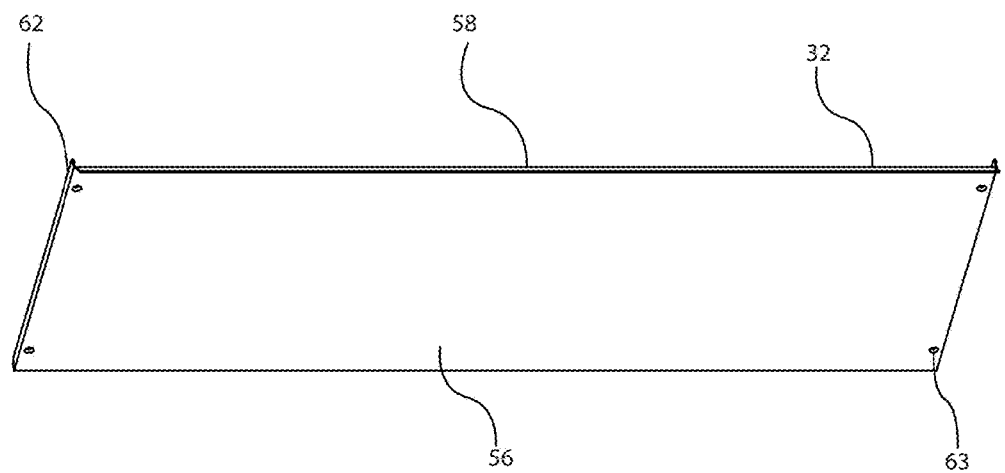
FIG. 11 is a front side perspective view of the interface panel of the LED retrofit kit of FIG. 1.

With reference to FIG. 11, a schematic representation of an interface panel 32 is depicted. The interface panel 32 will typically be of rectangular configuration for retrofitting troffers of standard rectangular sizes, but could also be square of a non-standard configuration. The interface panel 32 may be made from an electrically conductive or non-conductive material. In the exemplary embodiment, the interface panel is made from a relatively thin, metallic sheet such as aluminum sheet or steel sheet and will comprise a main panel 56 with stiffening lips on each side to strengthen the panel. In the exemplary embodiment of FIG. 11, the interface panel is formed with upward facing stiffening lips 58 on its long sides and upwardly facing stiffening lips on its short sides 62. In addition a hole 63 at each corner of the interface panel is provided for the passage of fasteners. Generally, the interface panel 32 and the LED board 40 will be sized such that the LED board is attached to the main panel 56, i.e. flat portion, of the interface panel.

If the interface panel 32 is made from a conductive material such as sheet steel or aluminum, care must be taken to ensure that the interface panel 32 does not make electrical contact with the light board 40. In some instances, the light board 40 may have exposed circuit traces on its backside. With this type of light board 40, a non-conductive adhesive may be used to attach a light board 40 to a conductive interface panel 32, In some instances, the LED board 40 is a sealed unit, in which case the adhesive need not be non-conductive. With both types of light boards, suitable arrangements of mechanical fasteners may also be used to attach the light board 40 to the interface panel 32. Suitable arrangements of mechanical fasteners are known in the art.

In the exemplary embodiment of FIGS. 1-6, the legs 34 will typically have the ability to flex so as to allow the legs 34 to snap into the well 28 of a troffer housing 12. Mechanical fasteners are a suitable means of attaching the legs 34 to the interface panel 32. In the exemplary embodiment, the legs 34 are preferably attached to the interface panel 32 via thumb screws 44. Threaded fasteners 46 for receipt of the thumb screws 44 are provided in the interface panel 32, typically at each corner. The threaded fasteners 46 may be in the form nut plates, clip nuts, or like attachments, as well as threaded holes in the interface panel 32. The thumbscrews 44 could also be metal screws which could be used in the place of fasteners 46 in the interface panel. The power supply or driver 42 may also be attached to the interface panel 32 via thumbscrews 44 and fasteners 46 installed in the panel.

Figure 6:
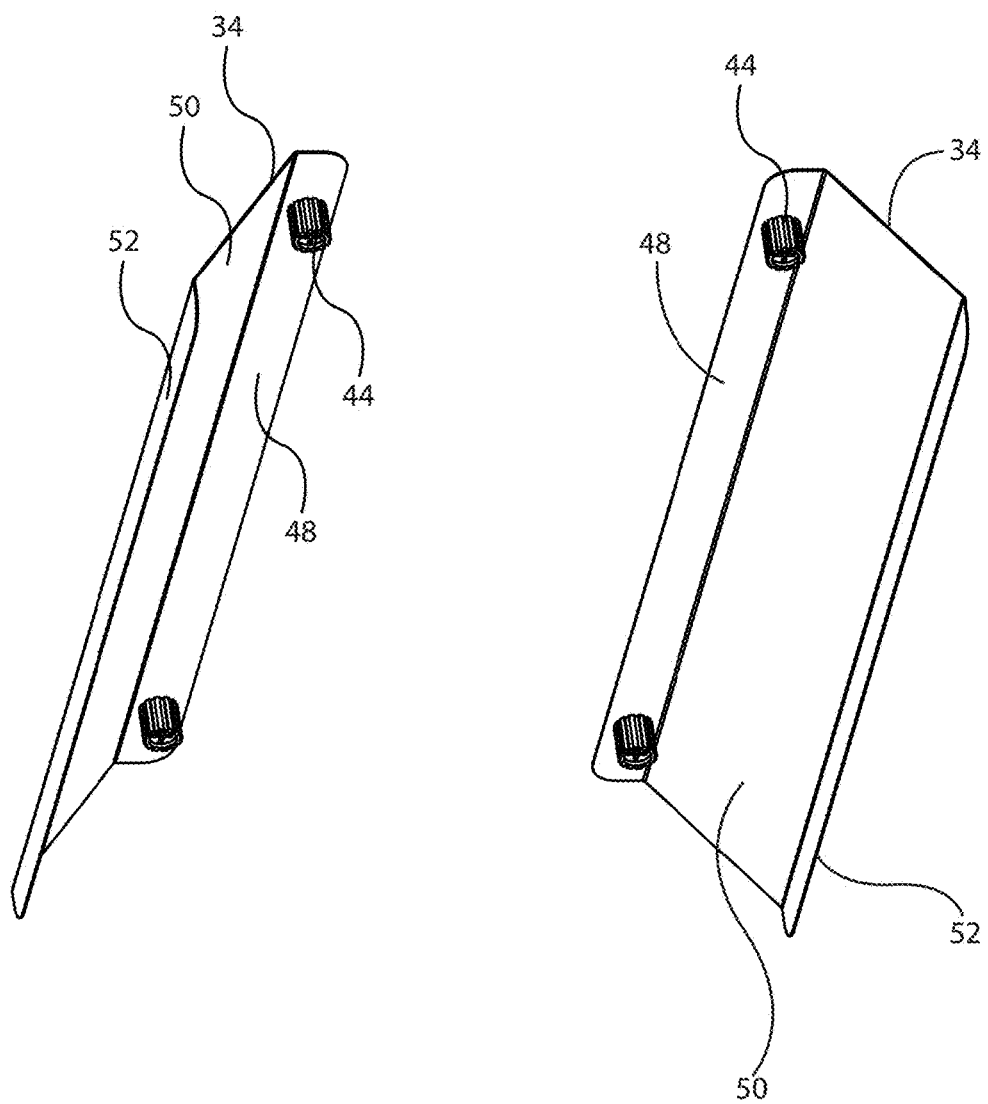
FIG. 6 is a perspective view of the legs of the LED retrofit kit of FIG. 1, shown with thumb screws attached.

With reference to FIG. 6, the legs 34 are angled and comprise first, second and third panels, made from a flexible material. The first panel 48 is a horizontal flange that connects via the thumbscrews 44 to the interface panel 32. The second panel 52 is a vertical flange that rests in the well 28 (see FIGS. 7 and 20) of the troffer housing 12 to be retrofitted. The third panel 50 interconnects the horizontal first panel 48 and vertical second panel 52 at an angle. The angle of the third panel 50 serves two purpose, i.e. it allows the retrofit kit 30 to snap into a troffer housing 12 to be retrofitted and it provides the retrofit kit 30 with a degree of adjustability in the retrofit process which is necessary because while fluorescent tubes are of standardized lengths, troffer housings 12 tend to vary somewhat in length depending upon the manufacturer.

Power supplies or drivers 42 for driving LED lights, suitable for use with the retrofit kit 30 of the present invention are well known in the art and need not be described in detail here.

Procedure for Installing the Retrofit Kit of the Present Invention

Whichever style troffer or luminaire is being retrofitted should be stripped of its non-essential components. Typically one will turn off power to the luminaire, remove the light source whether it is a fluorescent tube, bulb or other form of light. Remove any wire way or power supply or ballast cover; remove any unnecessary brackets, sockets, or wiring. FIG. 19 is representative of what a typical stripped fluorescent troffer might look like.

Figure 1:
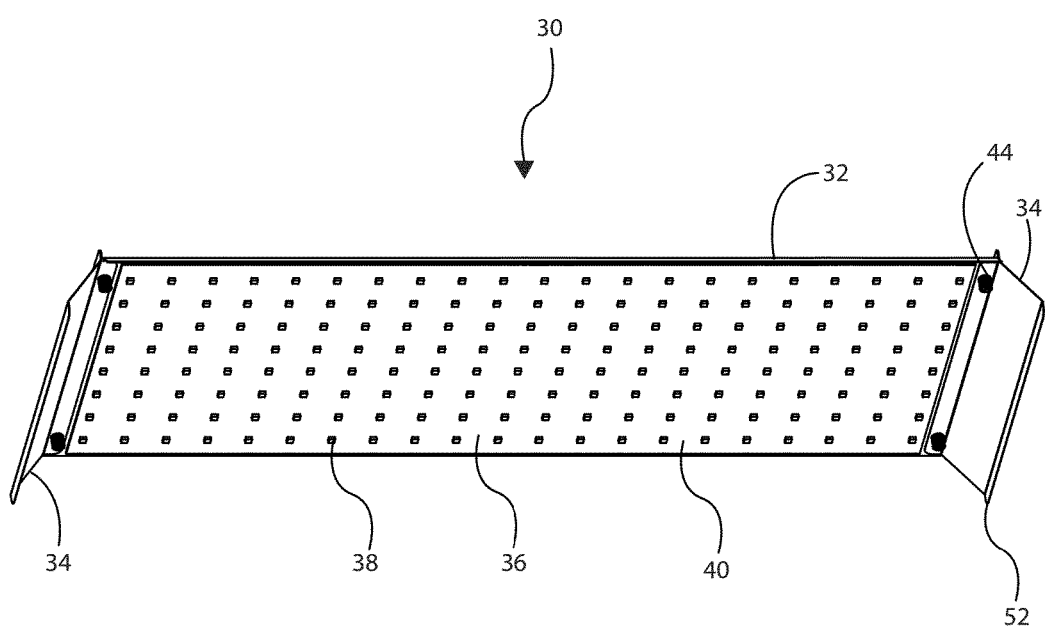
FIG. 1 is a front side perspective view showing an interface panel with removable legs attached thereto and an LED board attached thereto of an embodiment of the LED retrofit kit of the present invention.
Figure 2:
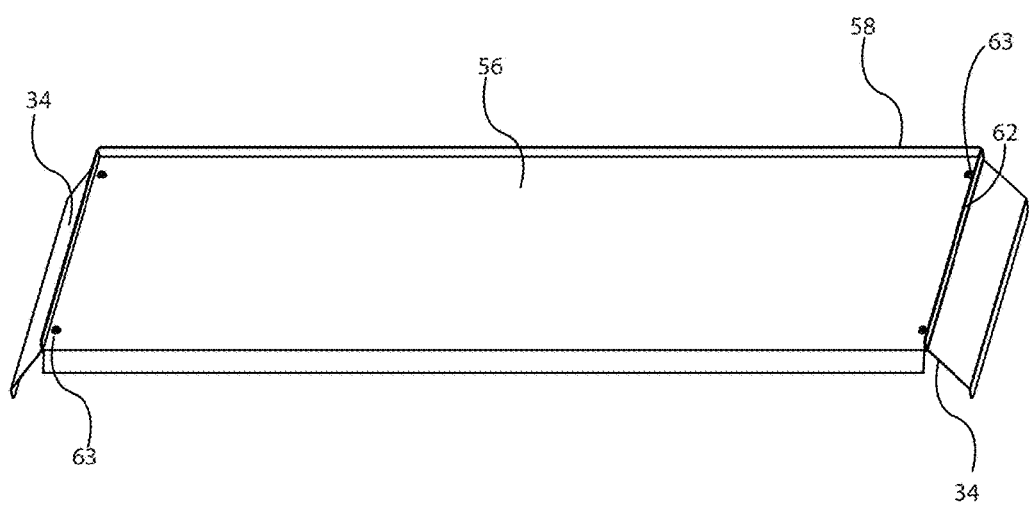
FIG. 2 is a back side perspective view of the interface panel with the removable legs attached, of the LED retrofit kit of FIG. 1.
Figure 3:
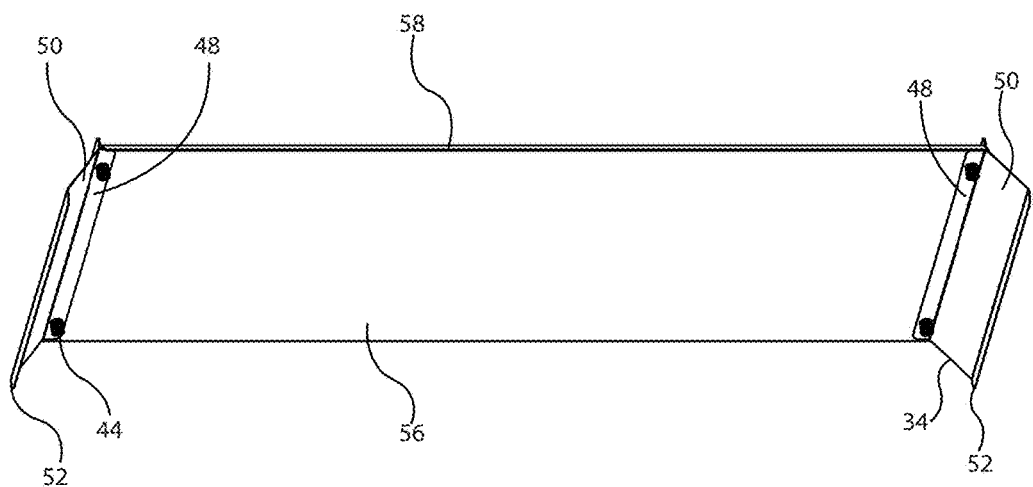
FIG. 3 is a front side perspective view of the interface panel with the removable legs attached of the LED retrofit kit of FIG. 1.
Figure 4:
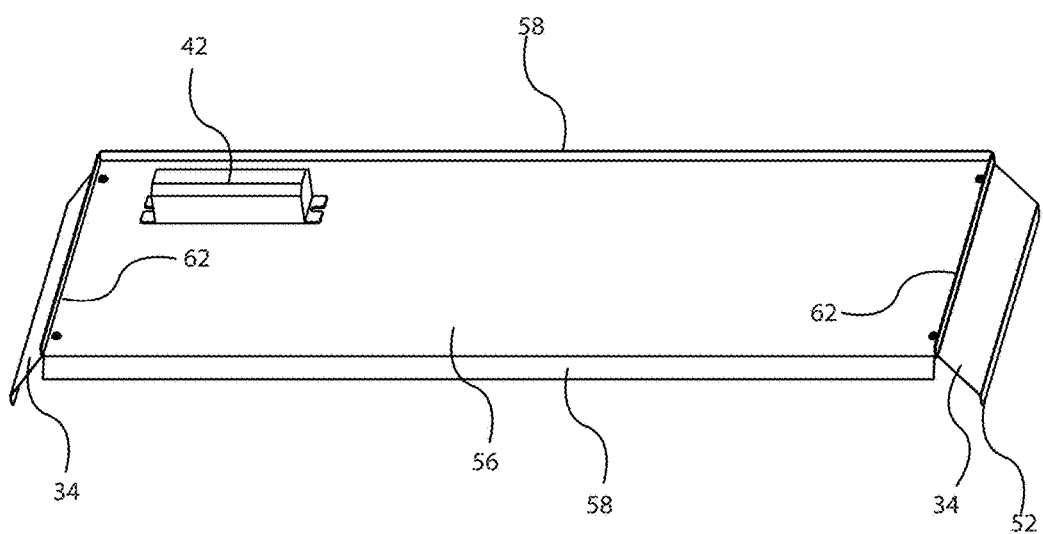
FIG. 4 is a back side perspective view of the interface panel with the removable legs attached of the LED retrofit kit of FIG. 1, with an LED driver also attached.
Figure 5:
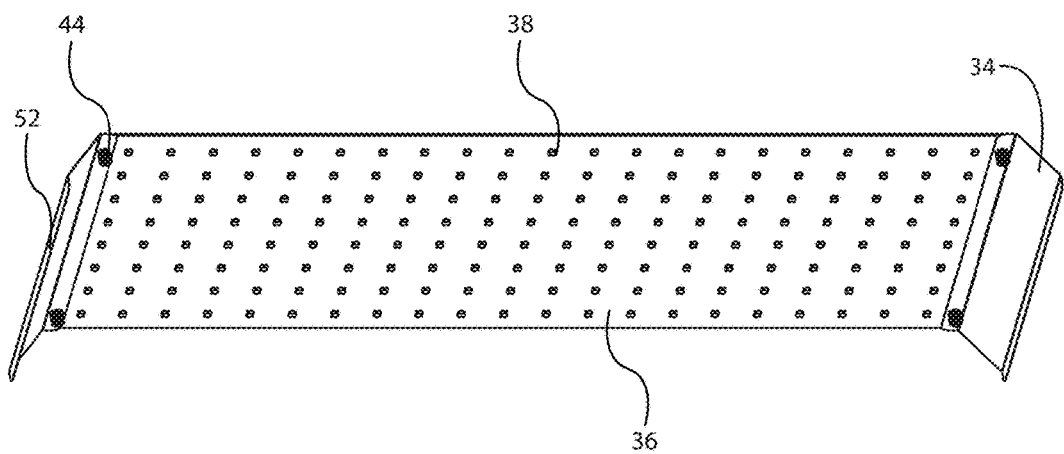
FIG. 5 is a front side perspective view on an LED board with the removable legs attached of the LED retrofit kit of FIG. 1.
Figure 7:
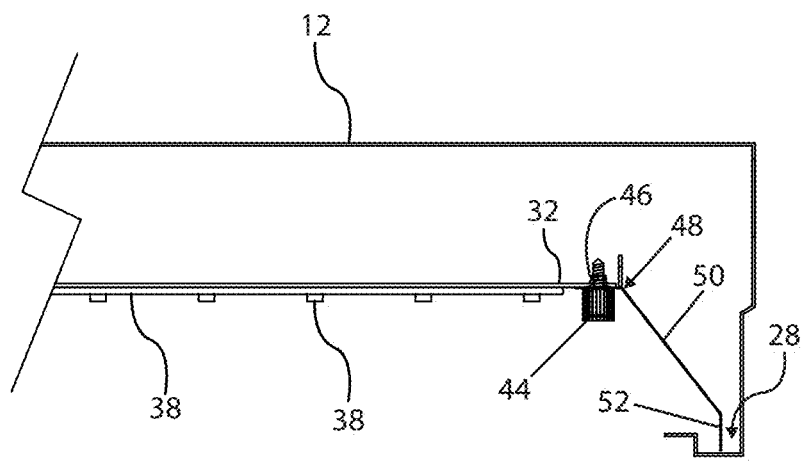
FIG. 7 is a side cut away side view of the legs of the LED retrofit kit of FIG. 1, sitting on the inner edge or ledge of a troffer.
Figure 8:
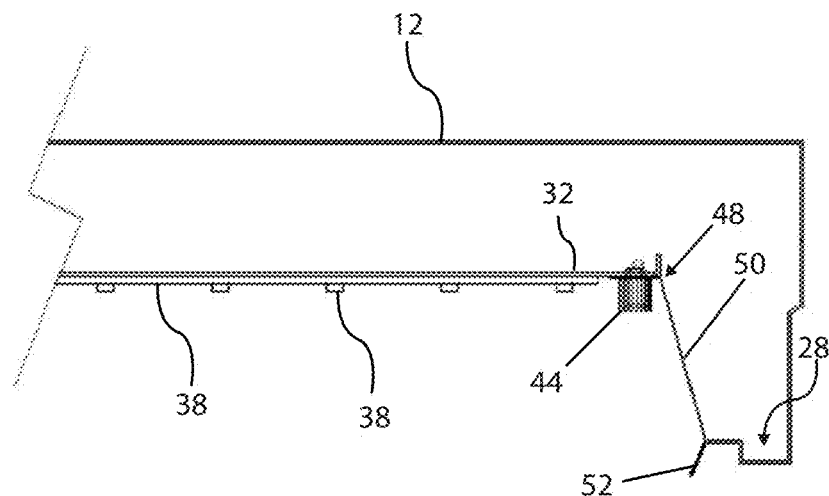
FIG. 8 is a side cut away view of the legs of the LED retrofit kit of FIG. 1, shown prior to being snapped into the inner edge or ledge of a troffer.
Figure 9:
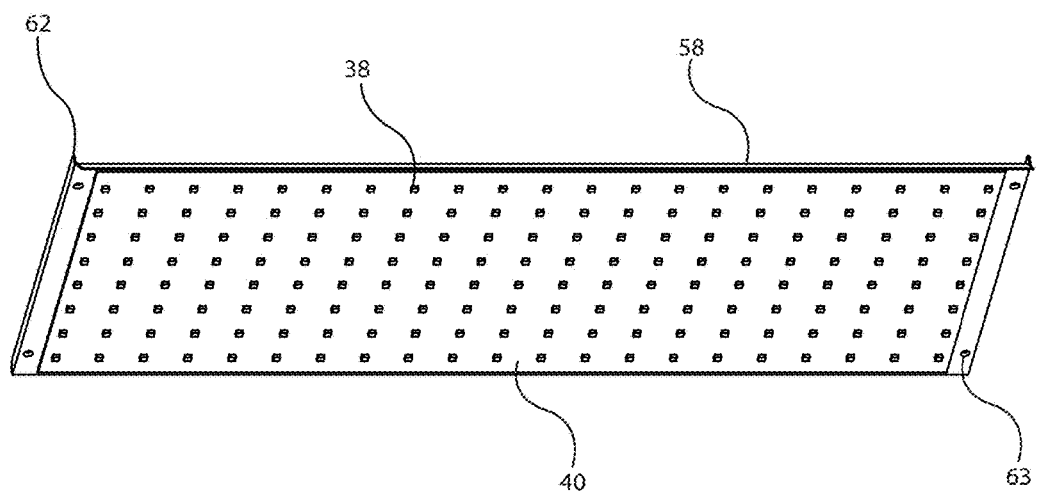
FIG. 9 is a front side perspective view on the interface panel of the LED retrofit kit of FIG. 1, depicting the mounting locations for the removable legs and with an LED board attached.

With reference to FIGS. 1 and 7-8, the LED retrofit kit 30, depicted in FIG. 1, is positioned in the stripped troffer housing 12, (see FIG. 19), as shown in FIG. 8. At this point, the flexible legs 34 of the retrofit kit 32 will contact a wall or lip of the well 28 about the periphery of the troffer housing 12. With reference to FIG. 7, continued upward pressure, will cause the legs 34 to snap over the wall or lip of the well 28 of the troffer housing 12 and will expand into place, as shown. No tools are required to install the LED retrofit kit 30 into the troffer housing 12.

An alternative method to insert the LED retrofit kit 30 would to hang one leg 34 from the peripheral well 28 of the troffer housing 12 and push the opposite leg into the opposing well, whereby the leg snaps into place as shown in FIG. 7. Another alternative method of installation is to remove legs the legs 34 from the interface panel 32 using the thumb screws 44. Then insert the interface panel 32 into the troffer housing 12, subsequently insert the legs 34 into position such that the vertical panels 52 of the legs 34 rest in the troffer wells 28 and the holes 54 of the horizontal panels 48 rest upon and are aligned with the holes 63 of the interface panel 32. The horizontal panels 48 of the legs 34 are then attached to the interface panel 32 using the thumbscrews 44.

Figure 21:
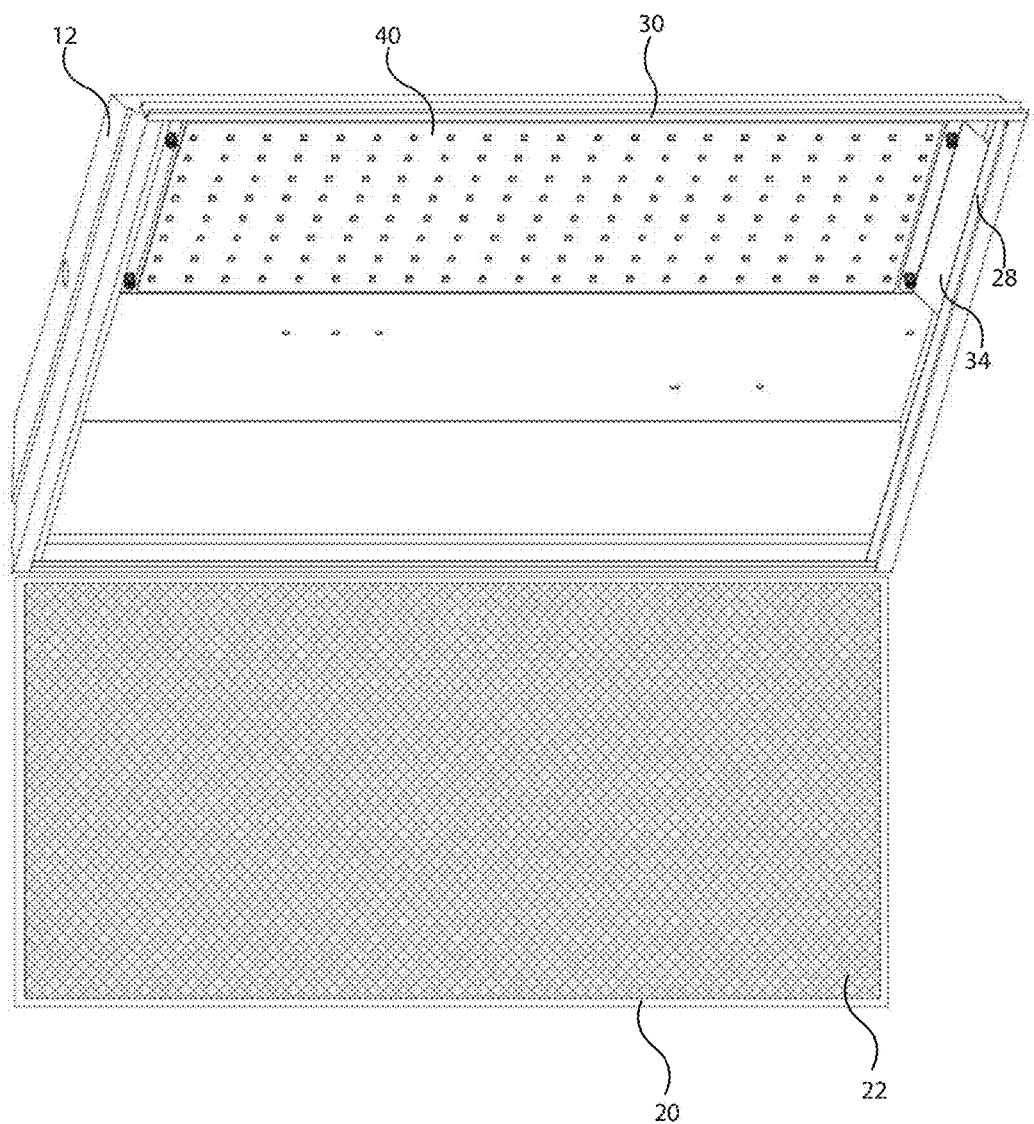
FIG. 21 is a perspective view of the LED retrofit kit of FIG. 1, installed within the troffer of FIG. 18, shown with lens/door open.

In all instances, the interface panel 32 is supported by the legs 34, resting upon the peripheral well or ledge 28 of the troffer housing. The weight of the interface panel 32 and the light board 40 securely holds the LED retrofit kit 30 in place. (See FIG. 21.) Multiple LED retrofit kits 30 may be used in one fixture. (See FIG. 22.) After the LED retrofit kit 30 is located in the troffer housing 12 and the power supply 42 wired, the original lens 22 which originally came with the troffer 10 can be left in place or the troffer may be retrofitted with a diffusion style lens or a volumetric lens.

Alternative Embodiments

Figure 12:
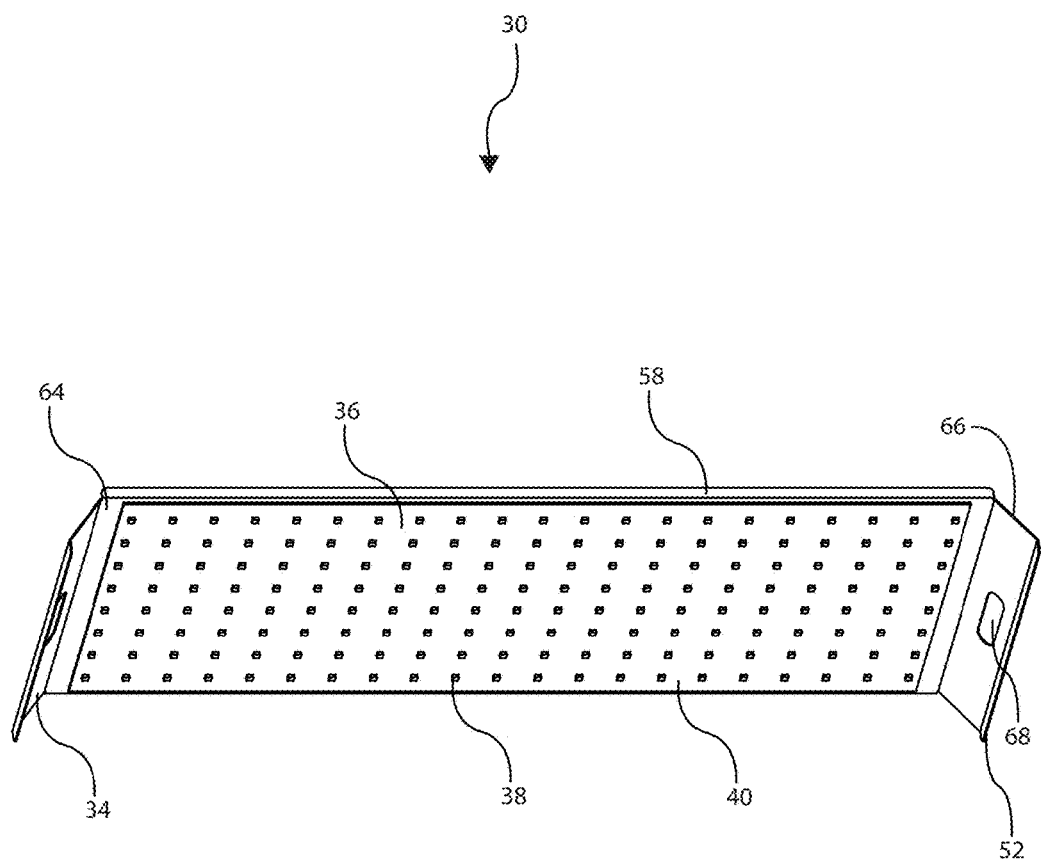
FIG. 12 is a front side perspective view of an alternative embodiment of the LED retrofit kit of the present invention showing an interface panel with non-removable legs and an LED board attached to the interface panel.
Figure 13:
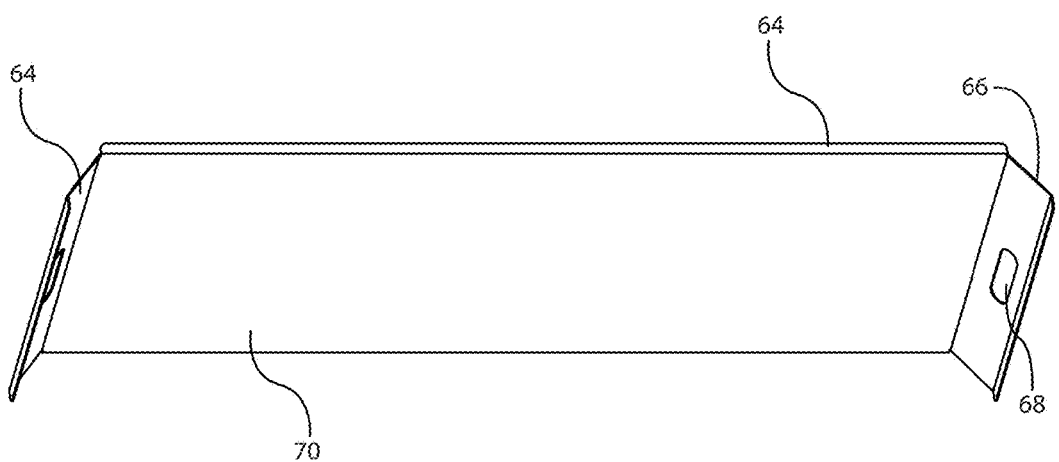
FIG. 13 is a front side perspective view of an interface panel of the LED retrofit kit of FIG. 12, shown with non-removable legs.
Figure 14:
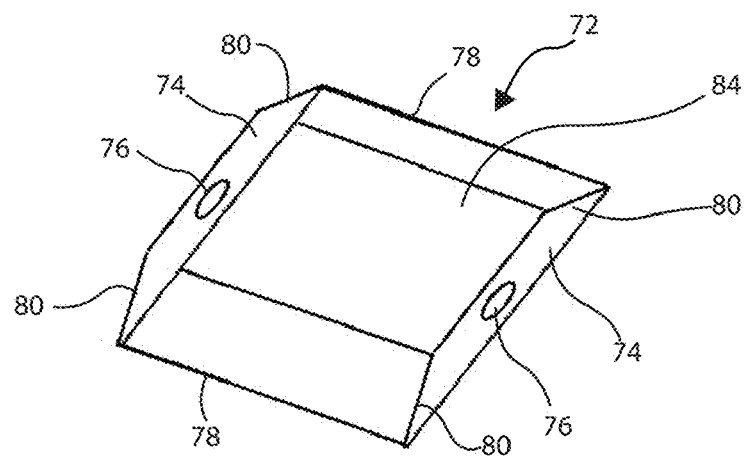
FIG. 14 shows a front side perspective view of an interface panel with wide side flaps of another alternative embodiment of the LED retrofit kit of the present invention.
Figure 15:
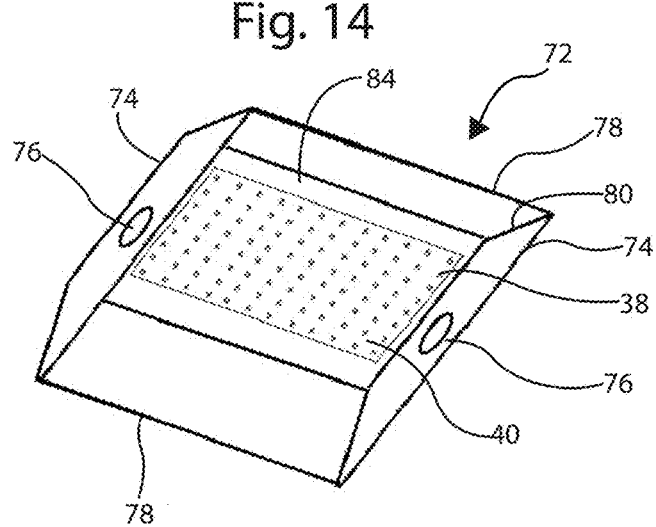
FIG. 15 is a front side perspective view of the interface panel of the alternative embodiment of the present invention shown in FIG. 14, with an LED board attached.
Figure 16:
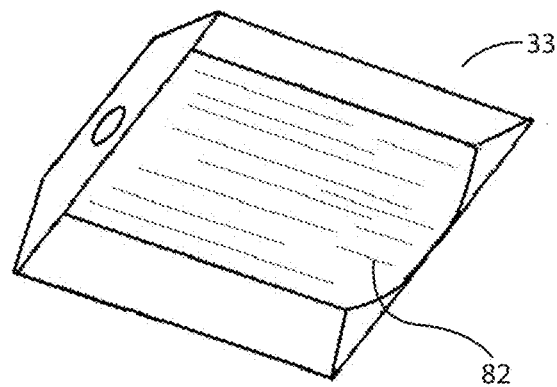
FIG. 16 is a front side perspective view of the interface panel of the alternative embodiment of the present invention shown in FIG. 14, with an integrated lens attached.

Several alternative embodiments of the LED retrofit kit 30 of the present invention are possible. With reference to FIGS. 12-13, an alternative embodiment LED Retrofit kit 31 is shown. Like the LED retrofit kit 30 (shown in FIGS. 1-11), the LED Retrofit kit 31 comprises an LED board 40 comprising a plurality of LEDs 38 mounted to a circuit board 36. The LED board 40 is mounted to an interface panel 64, which includes integral legs 66. The alternative retrofit kit 31 is completed by the inclusion of an LED driver 42 and associated electrical wiring.

Figure 22:
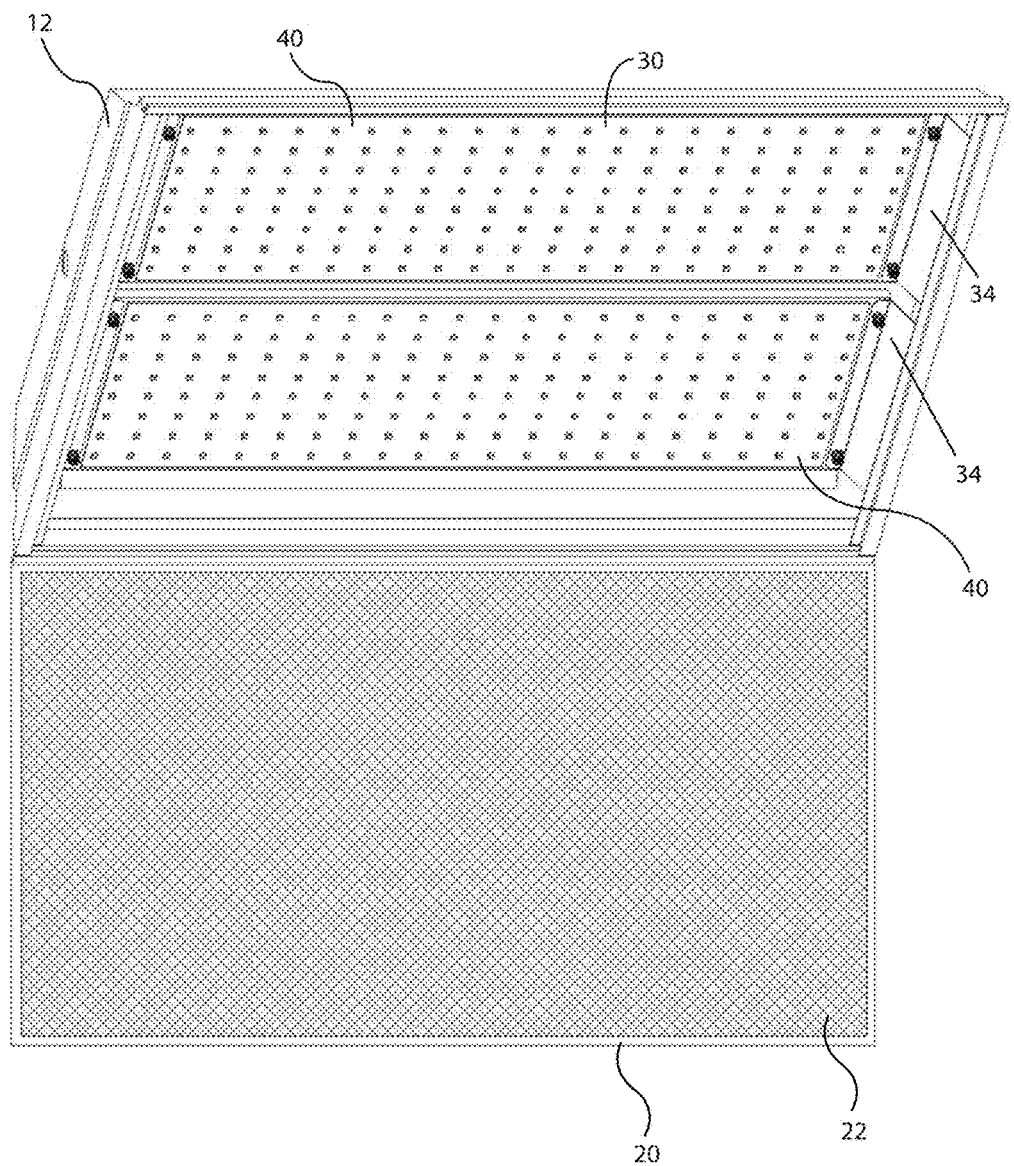
FIG. 22 is a perspective view of two of the LED retrofit kits of FIG. 1, installed within the troffer of FIG. 18, shown with the lens/door open.
Figure 23:
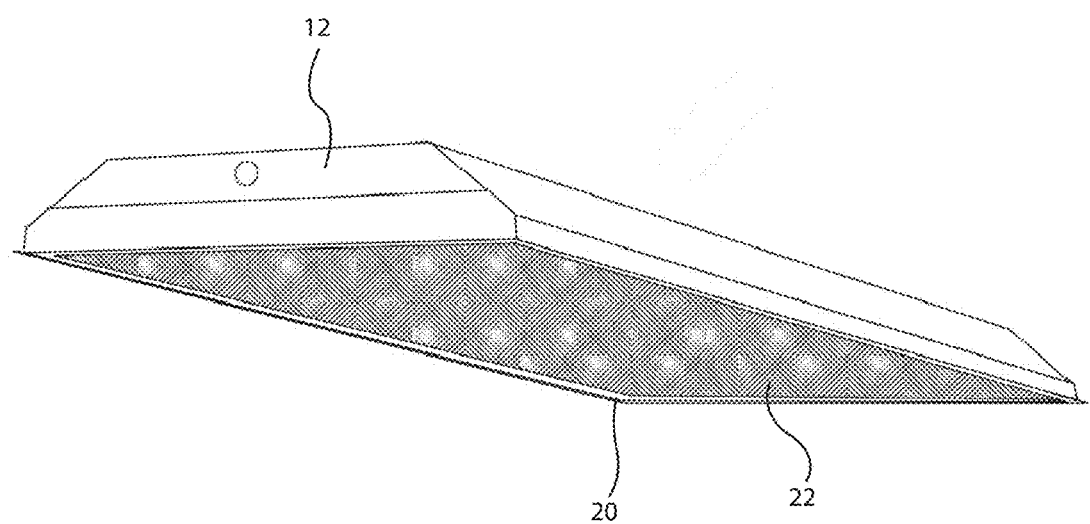
FIG. 23 is a perspective view of the troffer of FIG. 18, depicting the appearance of the retrofitted troffer with lens/door closed.

The primary difference between the LED retrofit kit 30 and LED retrofit kit 31 is that the legs 64 of the LED retrofit kit 31 are formed integrally with the interface panel 64. The legs 66 are equipped with an opening 68 for finger and hand access, which an installer can use to flex the legs 66 to assist in locating the LED retrofit kit 31 in a troffer housing 12. Otherwise, the assembly and installation of the retrofit kit 31 is the same as that for the LED retrofit kit 30. As with the LED retrofit kit 30, multiple LED retrofit kits 31 may be installed in a single troffer 10, as shown in FIG. 22. It should be noted that multiple LED boards 40 can be driven by a single power supply 42 sized to supply an appropriate amount of electrical power for the multiple LED boards 40.

FIGS. 14-17 show another alternative embodiment of an LED retrofit kit in accordance with the present invention, i.e. LED retrofit kit 33. This kit also comprises an LED board 40 comprising a plurality of LEDs 38 mounted and connected in electrical circuit on a circuit board 36. The LED board 40 is mounted to a main panel 84 of an interface panel 72, and a completed installation is connected to a power supply 42.

Figure 17:
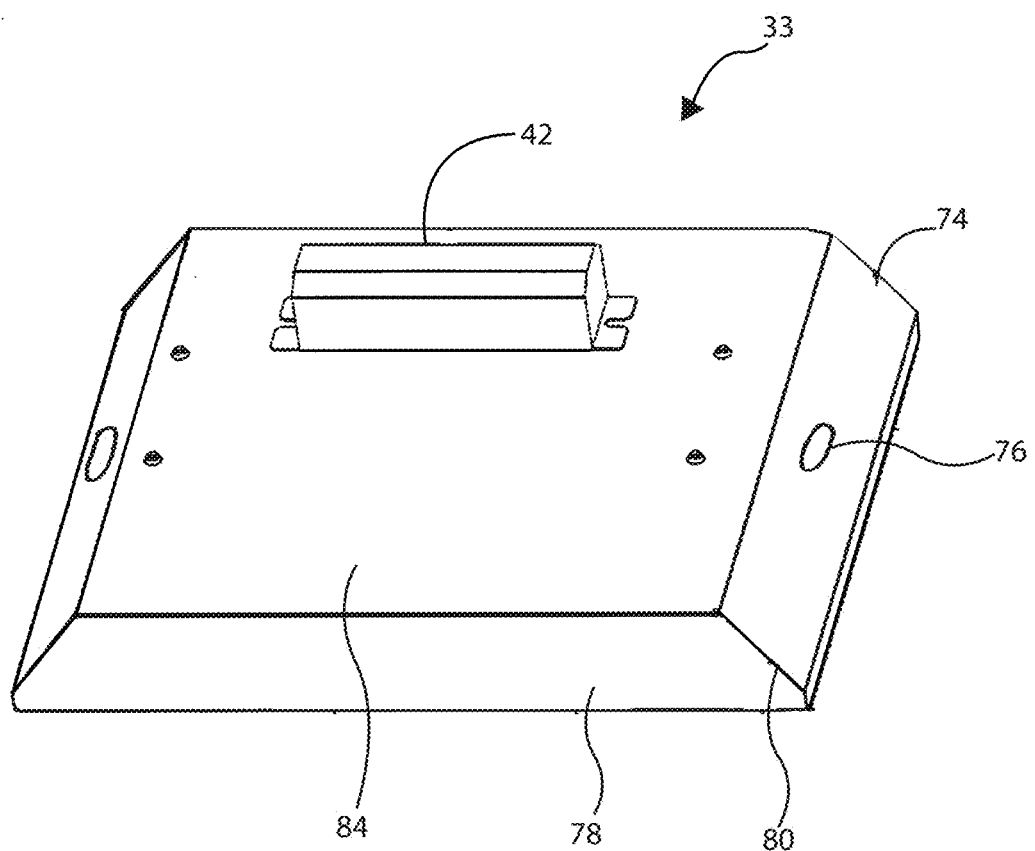
FIG. 17 shows back side perspective view of the interface panel of the alternative embodiment of the present invention shown in FIG. 14, with an LED driver attached.

The interface panel 72 of the LED retrofit kit 33 differs from the interface panels of the LED retrofit kits 30 and 31 in that the interface panel 72 includes the main panel 84, legs 74 and, in addition, side flaps 78 that are integral with the main panel 84 and that join with the legs 74 at seams 80. The legs 74 include openings 76 that allow an installer to flex the interface panel to ease installation into an existing troffer housing 12 and further allow for easy removal of an installed interface panel 72 from a troffer housing 12. The openings 76 are sized to allow the fingers of an installer's hands to fit through the openings. The inclusion of the side flaps 78 allows for the fitment of an integral lens 82 to the interface panel 72. An LED power supply 42 may be attached to the backside the main panel 84 as shown in FIG. 17.

With reference to FIG. 20, although the LED retrofit kit 33 may include side flaps, installation into a troffer housing is similar to that for LED retrofit kits 30 and 31, i.e. the legs 74 are snapped into the well 28 of the troffer housing 12 and expand into place. In all instances, the weight of the interface panel 72 is supported by the legs 74, resting in the well 28 of the troffer housing 12 and thereby securely hold the LED retrofit kit, i.e. interface panel 72, legs 74, led board 40 and power supply 42 in place. After the retrofit 33 is installed and wired, an optional integrated lens 82 may be installed to cover the led board 40.

Alternative Leg Embodiments for Use with the LED Retrofit Kit 30

In the exemplary embodiment of FIGS. 1-6, the legs 34 of the interface panel 32 are removable. The ability to remove one or more of the legs 34 allows for the use of alternative leg embodiments that replace one or more of the legs 34 and that allow the LED retrofit kit 30 to be installed in troffer housings 12 of nonstandard length.

Figure 24:
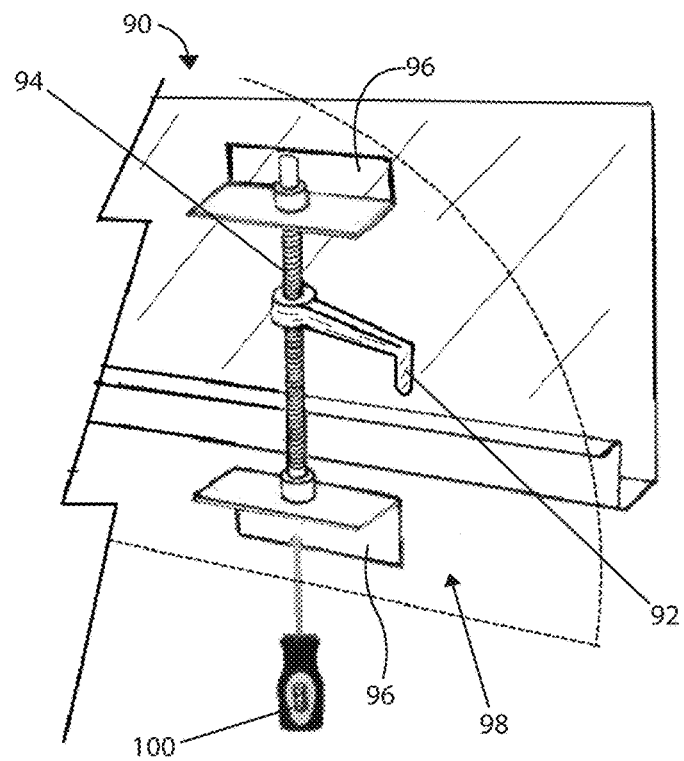
FIG. 24 is a perspective view of an alternative leg assembly for use with the removable leg embodiment of the LED retrofit kit of the present invention of FIG. 1, with the leg assembly shown in an unlocked position and attached to the interface panel of the LED retrofit kit with the troffer ledge shown in the background.
Figure 25:
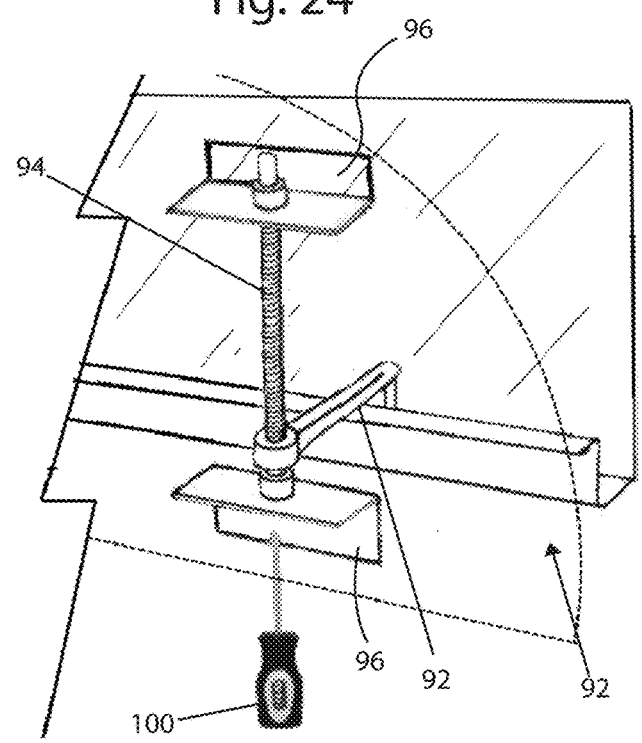
FIG. 25 is a perspective view of the alternative leg assembly of FIG. 24 for use with the removable leg embodiment of the LED retrofit kit of the present invention of FIG. 1, showing the alternative leg assembly with a tightened bolt bringing the leg into a position in which it locks itself to the troffer lip or ledge.

With reference to FIGS. 24 and 25, an alternative leg assembly 90 is shown. The leg assembly 90 comprises an L-shaped leg 92 which is threaded at one end and attached to a threaded rod 94. The threaded rod 94 is attached to a wall 98 via flanges 96. The wall 98 may be a vertical flange which replaces the angled leg 34 of FIGS. 1-6. When the threaded rod 94 is rotated with a screw driver 100, the L-shaped leg 92 rotates and travels upwardly (clockwise rotation) or downwardly (counter-clockwise rotation), as needed, to make contact with the well 28 of the troffer housing 12, at which time the L-shaped leg 92 hooks itself to the well 28, securing the LED retrofit kit 30 to the troffer housing 12, as shown in FIG. 25.

FIGS. 25A through 25D show further variations on the leg assembly 90 of FIGS. 24 and 25. FIGS. 25A and 25B, depict a variation on the shape of the L-shaped leg 92, wherein the L-shaped leg is relatively short in length. Similarly, FIGS. 25C and 25D, depict a variation where the L-shaped leg is relatively long. These alternative embodiments illustrate that the length of the leg may be varied as needed to fit the LED retrofit kit 30 to a particular troffer housing.

Figure 26:
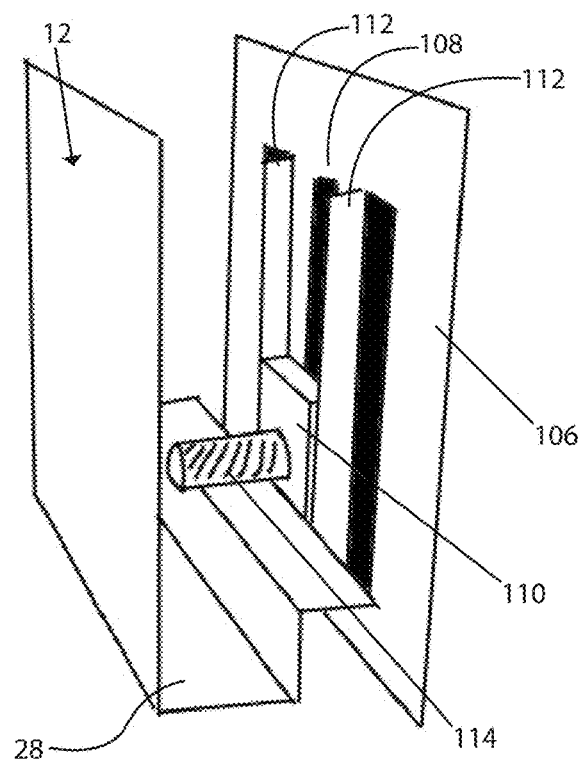
FIG. 26 is a rear perspective view of another alternative leg assembly for use with the removable leg embodiment of the LED retrofit kit of the present invention of FIG. 1, showing the leg assembly on a troffer lip or ledge and showing slot features that allow the height of the leg to be adjusted.
Figure 27:
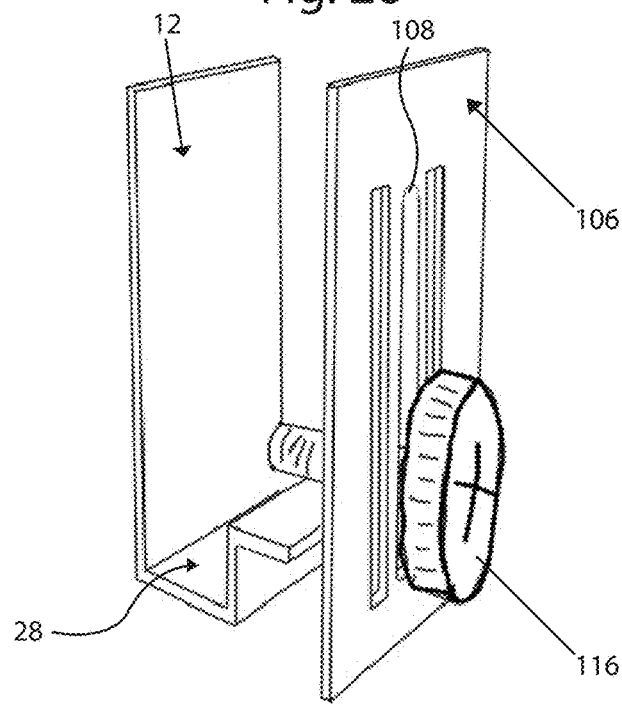
FIG. 27 is a front perspective view of the alternative leg assembly of FIG. 26 for use with the removable leg embodiment of the LED retrofit kit of the present invention of FIG. 1.

With reference to FIGS. 26 and 27, another alternative leg assembly 102 is shown. The alternative leg assembly 102 comprises a vertical wall 106 which replaces the leg 34 of the retrofit kit 30, a central slot 108 between with flanges 112 on each side of the slot 108 are formed in the vertical wall 106. The flanges 112 serve as guides for a nut plate 110. A bolt 114 engages the nut plate 110. The bolt 114 serves essentially as a leg and is adjusted until it sits on an edge or lip of the inner wall 18 of the well 28 of a troffer housing 12. Once the desired height is achieved the bolt 114 is tightened keeping the bolt 114 and retrofit kit 33 in place.

With reference to FIGS. 28A through 28D, an alternative to the leg assembly 34 of the removable leg embodiment of the LED retrofit kit 30 is a key and slot assembly 117, as shown. The key and slot assembly 117 comprises a key 118 equipped with a handle element 124 which is connected to a threaded portion 126. The key 118 also includes a collar 130 fixedly attached to the handle element 124. Fixed to the key 118 is a nut or nut-style fastener 128 which is engaged by the threaded portion 126 of the handle 124.

The key and slot assembly 117 also includes a vertical key panel 99 which replaces the leg assembly 34 of the LED retrofit kit 30 of FIG. 1. The vertical key panel 99 includes a key opening 120 and a key slot 122. In use, the key 118 is positioned through the key opening 120 and angled downwardly such that the threaded portion 126 of the key handle 118 is engaged in the slot 122 with the slot 122 being disposed between the collar 130 and the upper panel 132 of the key 118. The key 118 is then pushed downwardly such that the key engages the well 28 of a troffer housing 12. At this point, the handle 124 of the key is rotated to cause the collar 130 to exert pressure on the slot and upper panel 132 of the key 118, thereby tightening the key in place.

In the alternative leg embodiments discussed above, the leg can also take other forms such as bars, rods, angle brackets, and the like.

The term LED is specifically used to describe the light sources used in the light board 40 of the present invention. The term LED should be broadly construed to include LEDs, micro LEDs, Nano LEDs, edge lit LEDs, Light Guide Panel LEDs, AC LEDs, as well as fluorescent, halogen, incandescent or organic light sources, which may be used in place of traditional LEDs on the light board 40. While an LED board is specifically used in the exemplary embodiments, other lighting mechanisms can be used including edge lit LEDs using a light guide panel and lens. The LED retrofit kit of the present invention may optionally include additional sensors, wireless receivers, dimmers, or other electronic equipment.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. An LED retrofit conversion kit adapted for use in a troffer housing, comprising:
   an LED board, the LED board comprising a printed circuit board containing a plurality of LEDs connected in electrical circuit;
   an interface panel, the interface panel have a flat surface for mounting the LED board;
   means for attaching the interface panel within a troffer housing;
   wherein the means for attaching the interface panel within the troffer housing are legs attached at opposite ends of interface panel and adapted to rest in a well of the troffer housing; and
   wherein the legs are flexible legs removably attachable to the interface panel and comprise three panels, the three panels being a horizontal panel removably attachable to the interface panel, a vertical panel which rests in the well of the troffer housing when the interface panel is installed in the troffer and an angled panel interconnecting the horizontal panel and the vertical panel.

2. The LED retrofit conversion kit of claim 1 wherein the retrofit kit further includes a power supply adapted to operate the LEDs of the LED board.

3. The LED retrofit conversion kit of claim 1 wherein the angled panel of the flexible leg includes an opening sufficiently large for an installer's hand to pass through.

4. The LED retrofit conversion kit of claim 3 wherein the flexible legs are removably attachable to the interface panel by means of thumb screws.

5. The LED retrofit conversion kit of claim 1 wherein the interface panel is generally rectangular with a main flat panel bordered by upwardly or downwardly oriented stiffening panels.

6. The LED retrofit conversion kit of claim 1 wherein the flexible legs are integrally formed as part of the interface panel and comprise two panels, the two panels being a vertical panel which rests in a well of the troffer housing when the interface panel is installed in the troffer and an angled panel interconnecting the vertical panel with an edge of the interface panel.

7. The LED retrofit conversion kit of claim 6 wherein the angled panel of the flexible leg includes an opening sufficiently large for an installer's hand to pass through.

8. The LED retrofit conversion kit of claim 1 wherein the plurality of LEDs may comprise AC LEDs, micro LEDs, Nano LEDs, edge lit LEDs, and Light Guide Panel LEDs.

9. The LED retrofit conversion kit of claim 1 wherein the interface panel may be installed in the troffer housing without the use of tools.

10. The LED retrofit conversion kit of claim 1 wherein the interface panel includes leg panels and side panels where the leg panels and side panels join at a seam at each intersection.

11. An LED retrofit conversion kit adapted for use in a troffer housing, comprising:
    an LED board, the LED board comprising a printed circuit board containing a plurality of LEDs connected in electrical circuit;
    an interface panel, the interface panel have a flat surface for mounting the LED board;
    means for attaching the interface panel within a troffer housing;
    wherein the means for attaching the interface panel within the troffer housing are legs attached at opposite ends of the interface panel and adapted to rest in a well of the troffer housing; and
    wherein at least one leg comprises a horizontally extending L-shaped arm threaded to a vertical rod, wherein the height of the arm may be raised or lowered by rotating the threaded rod clockwise or counter-clockwise, wherein the height of the L-shaped arm is adjusted to engage a wall of the well of a troffer housing.

12. An LED retrofit conversion kit adapted for use in a troffer housing, comprising:
    an LED board, the LED board comprising a printed circuit board containing a plurality of LEDs connected in electrical circuit;
    an interface panel, the interface panel have a flat surface for mounting the LED board;
    means for attaching the interface panel within a troffer housing;
    wherein the means for attaching the interface panel within the troffer housing are legs attached at opposite ends of the interface panel and adapted to rest in a well of the troffer housing; and
    wherein at least one leg comprises a horizontally extending bolt of sufficient length to engage a wall of the well of a troffer, wherein the height of the horizontally extending bolt may be adjusted via a slot and nut plate.

13. An LED retrofit conversion kit adapted for use in a troffer housing, comprising:
    an LED board, the LED board comprising a printed circuit board containing a plurality of LEDs connected in electrical circuit;
    an interface panel, the interface panel have a flat surface for mounting the LED board;
    means for attaching the interface panel within a troffer housing; and
    wherein at least one of the means for attaching the interface panel within a troffer housing is a key and slot assembly, wherein a handle of the key includes a fixed collar and a threaded portion disposed forward of the collar, wherein the threaded portion engages a threaded fastener on the key, wherein the collar and threaded fastener are disposed on opposite sides of the slot when the key is engaged in the slot.

14. An LED retrofit conversion kit adapted for use in a troffer housing, comprising:
    a troffer housing having a well about an inner periphery of the housing;
    an LED board, the LED board comprising a printed circuit board containing a plurality of LEDs connected in electrical circuit;
    an interface panel, wherein the interface panel is generally rectangular with a main flat panel for mounting the LED board, the main panel being bordered by perpendicularly oriented stiffening panels;
    a pair of legs for attaching the interface panel within the well of the troffer housing;
    wherein the legs are flexible legs removably attachable to the interface panel and wherein each leg comprises three panels, the three panels being a horizontal panel removably attachable to the interface panel, a vertical panel which rests in a well of the troffer housing and an angled panel interconnecting the horizontal panel and the vertical panel; and wherein the vertical panel of each leg snaps into the well of the troffer housing.

15. The LED retrofit conversion kit of claim 14, wherein at least one of the pair of legs comprises a horizontally extending L-shaped arm threaded to a vertical rod, wherein the height of the arm may be raised or lowered by rotating the threaded rod clockwise or counter-clockwise, wherein the height of the L-shaped arm is adjusted to engage a wall of the well of the troffer housing.

16. The LED retrofit conversion kit of claim 14, wherein at least one leg of the pair of legs comprises a horizontally extending bolt of sufficient length to engage a wall of the well of a troffer, wherein the height of the horizontally extending bolt may be adjusted via a slot and nut plate.

17. The LED retrofit conversion kit of claim 14 wherein the retrofit kit further includes a power supply adapted to operate the LEDs of the LED board.

18. The LED retrofit conversion kit of claim 14 wherein the interface panel is configured to include an integral lens.

\* \* \* \* \*